(12) United States Patent
Stephan et al.

(10) Patent No.: US 8,741,019 B2
(45) Date of Patent: Jun. 3, 2014

(54) FLANGE WITH INTEGRAL ELECTRICALLY CONDUCTIVE SEAL AND SEAL ARRANGEMENT

(71) Applicant: Mann+ Hummel GmbH, Ludwigsburg (DE)

(72) Inventors: Andreas Stephan, Speyer (DE); Melanie Hirsch, Speyer (DE); Karlheinz Muenkel, Oberderdingen-Flehingen (DE); Daniela Zinic, Speyer (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/746,190

(22) Filed: Jan. 21, 2013

(65) Prior Publication Data

US 2013/0125519 A1 May 23, 2013

Related U.S. Application Data

(63) Continuation of application No. 12/714,665, filed on Mar. 1, 2010, now abandoned.

(51) Int. Cl.
*B01D 46/00* (2006.01)
*F16J 15/06* (2006.01)

(52) U.S. Cl.
USPC ............ 55/502; 277/650; 277/652; 277/654; 277/936; 277/939; 277/944

(58) Field of Classification Search
USPC ............ 55/502; 277/650, 652, 654, 936, 938, 277/939, 944
See application file for complete search history.

(56) References Cited

U.S. PATENT DOCUMENTS

| | | | | |
|---|---|---|---|---|
| 5,066,318 A | * | 11/1991 | McDonough | ................... 55/502 |
| 5,286,568 A | * | 2/1994 | Bacino et al. | ................ 428/422 |
| 5,800,584 A | * | 9/1998 | Hinderer et al. | ................ 55/482 |
| 6,093,231 A | * | 7/2000 | Read et al. | ................... 55/498 |
| 6,136,076 A | * | 10/2000 | Read | ............................... 96/189 |
| 6,254,107 B1 | * | 7/2001 | Neuhaus | ........................ 277/650 |
| 6,280,492 B1 | * | 8/2001 | Binder et al. | ................. 55/350.1 |
| 6,347,021 B2 | * | 2/2002 | Kazmierczak et al. | .... 360/97.21 |
| 6,966,940 B2 | * | 11/2005 | Krisko et al. | ................... 55/497 |
| 7,354,474 B2 | * | 4/2008 | Both | ................................ 96/69 |
| 7,645,310 B2 | * | 1/2010 | Krisko et al. | ................... 55/337 |
| 2006/0098387 A1 | * | 5/2006 | Chandra et al. | ............... 361/303 |

* cited by examiner

*Primary Examiner* — Robert Clemente
(74) *Attorney, Agent, or Firm* — James Hasselbeck

(57) ABSTRACT

A sealing arrangement is provided in which a seal flange includes a seal flange body having an integrated electrically conductive seal integrated onto an outer circumferential edge of the seal flange body. The seal flange with integrated seal is installable to seal between two confronting mounting flange faces. The seal is operative to conduct electric charge between said seal flange body and said mounting flanges.

11 Claims, 2 Drawing Sheets

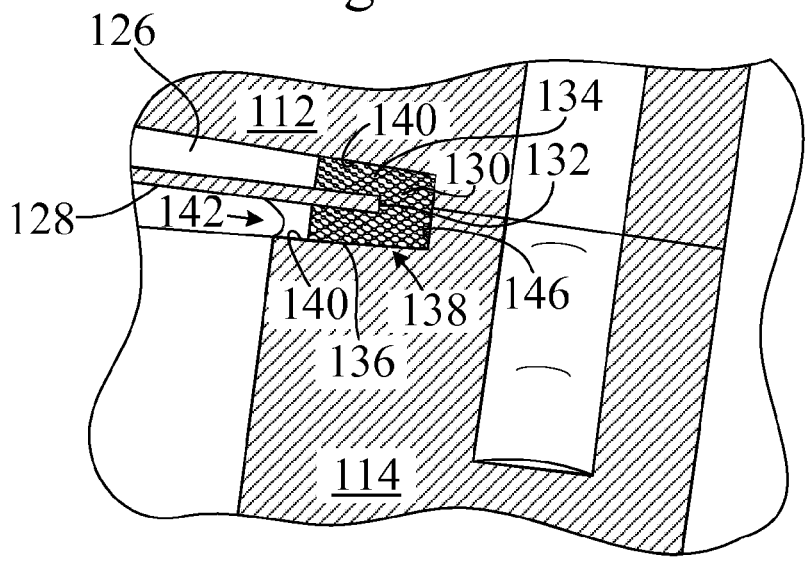
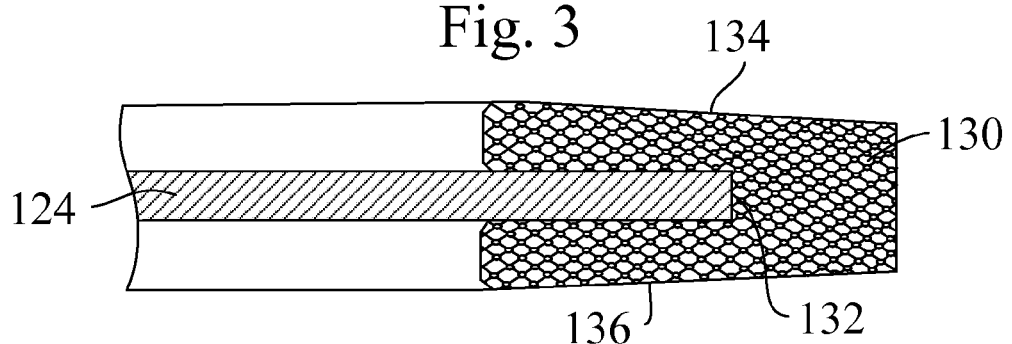
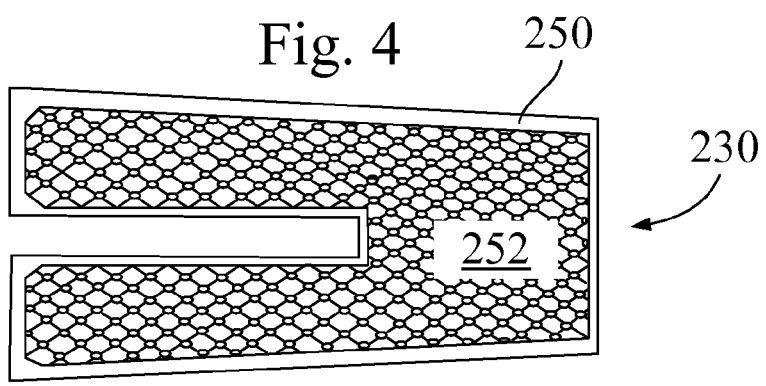

FLANGE WITH INTEGRAL ELECTRICALLY CONDUCTIVE SEAL AND SEAL ARRANGEMENT

CROSS REFERENCE TO RELATED APPLICATIONS

This application is continuation of U.S. Ser. No. 12/714,665 filed Mar. 1, 2010, the entire disclosure of which is incorporated herein by reference.

TECHNICAL FIELD

The disclosure relates to a sealing arrangement including a flange with an integral circumferential seal integrated thereon, wherein the seal is electrically conductive to dissipate static charge.

BACKGROUND OF THE INVENTION

It is known that in compressed gas or air systems a static charge buildup may occur on components exposed to the compressed gas or air stream. Static charge buildup can have several undesired consequences.

Another undesirable consequence may occur when accumulated electrostatic charges are discharged in the vicinity of a combustible medium. For example, a compressed gas system may carry a mixture of air and solvent or fuel vapors. A static electric charge buildup may result in a spark with sufficient energy to ignite such a combustible mixture with highly undesired and potentially destructive results.

Yet another undesirable consequence of electric charge buildup may compromise the otherwise effective operation of process components. For example, an electrostatic charge buildup in an air/oil separator of a compressed air system may compromise the entrapment of liquids in the coalescing/separation media due to the effect of repulsion of like electrical charges. For example, charged liquid droplets or mist contacting an ungrounded air/oil separator may transfer electrical charge from the mist or droplets to the separation media. As electrical charge accumulates on the separation media, the accumulated electrical charge acts to repel other like charged mist or droplets from the separation media, thereby inhibiting the coalescing of entrained liquid aerosols on the separation media and their effective removal from the compressed gas stream.

An electric charge effect can occur when electrons are removed from some of the atoms in one material and transferred to atoms in another (or maybe even the same) material. The transfer of electric charge can occur when two materials contact and possibly rub against each other, causing electrons to move across the interface. This transfer of charges may produce a charge accumulation.

To dissipate accumulated electric charges, the various components susceptible to static charge buildup may be provided with an electrical connection to an electrical ground.

SUMMARY OF THE INVENTION

One object of the present invention is to provide an electrically conductive seal that is integrated directly with and onto a flange of a component to be grounded.

Another object of the present invention is to provide an electrically conductive seal configured to conduct electric charge between two or more facing and mating surfaces or flanges.

Another object of the invention is to provide a flange with an integrated seal configured to provide a ground path for a device installed in gas or fluid pipe or duct that may be susceptible to the accumulation of static charge.

Another object of the invention is to provide an electrically conductive mounting flange and integrated electrically conductive seal on an apparatus exposed to fluid stream capable of static charge generation whereby the integrated seal provides a portion of an electrical ground path to dissipate electric charge from the apparatus and wherein the integrated seal replaces and thereby eliminates the use of one or more prior art annular gaskets or seal components and grounding components.

Another object of the invention is to provide a flange with a peripheral electrically conductive seal, the flange and seal configured to be received into a complimentary configured seal receiving contour formed between two opposing mating mounting flanges wherein the complimentary contour cooperates with the seal equipped flange to provide a positive, more precise and repeatable positioning of the seal equipped flange between the opposing mating flanges, thereby providing an exact positioning for a positive seal.

Another object of the invention is to provide a seal receiving and guiding contour cooperating with the complimentary geometry of the electrically conductive elastomeric seal configured to enable the full circumferential mating contact between the mounting flange faces, wherein the electrically conductive elastomeric seal is thereby isolated from the external environment and wherein the mating closure of said mounting flanges reduces leakage in the event of seal failure.

The above features and advantages and other features and advantages of the present invention are readily apparent from the following detailed description of the best modes for carrying out the invention when taken in connection with the accompanying drawings and claims.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 2A depicts an enlarged view of the seal and the seal receiving and guiding contour of FIG. 2 for better understanding;

FIG. 3 depicts an enlarged partial sectional view of the seal flange with the electrically conductive seal, specifically the region identified as "3-3" in FIG. 2, consistent with the present invention; and FIG. 4 schematically illustrates an alternate embodiment of the electrically conductive seal, consistent with the present invention.

Figure 1:
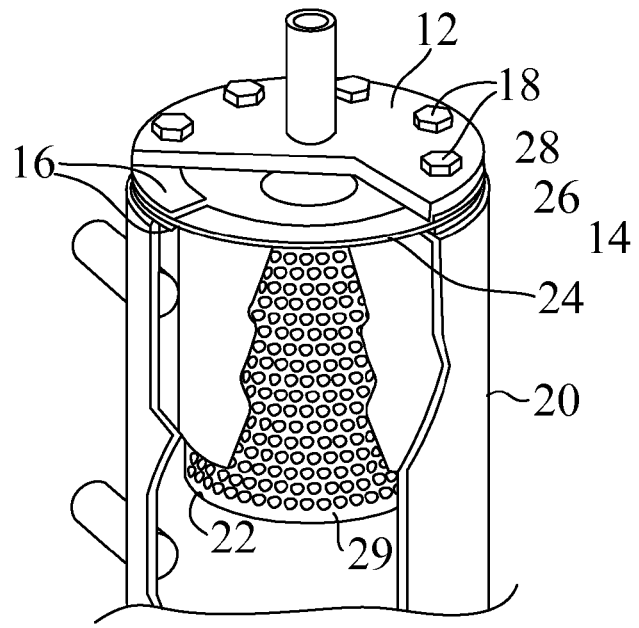
FIG. 1 is a cut-away perspective view that illustrates a prior art flange and annular gasket sealing arrangement.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a flange with an integral circumferential electrically conductive seal integrated thereon as disclosed herein. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As to their electrical properties, suitable seal materials such as polymers and fluoropolymers are typically categorized as dielectrics or in some cases as insulators. A dielectric is an electrical insulator that may be polarized by the action of an applied electric field. In either case, such seal materials by themselves are not considered good electrical conductors.

Seal materials may be provided with electrical conductive properties by using a suitable polymer seal material (having the desired elastomeric and chemical resistance properties for the seal and application) as a base matrix material into which, for example, various metals, metal-covered particles, carbon black, graphite, soot, or combinations of these or other electrically conductive materials are dispersed to function as a conductive filler. Various conductive metallic fillers may be identified that are suitable for the chemical process environment in which the seal is to be exposed, however soot and carbon black are preferred herein (when compatible with the process) due to their ready availability and their lower relative cost.

The term elastomer as used herein refers to a pliable material, possibly formed of long molecular chains, and having the property of returning to an original undeformed shape after being geometrically stretched or compressed. As can be readily understood, this elastic property of elastomeric materials make such materials well suited for use as pliable sealing members, such as to seal a gap between mated or proximately positioned components.

Furthermore, for an elastomeric seal modified with conductive fillers to actually be electrically conductive in the real world, the typical distances between the conductive filler particles in the seal must be small enough so that enough particles touch to form an electrically conductive path across or through the conductive elastomeric seal. This may be accomplished by admixing at least a minimum volume fraction of conductive filler particles within the elastomer material prior to molding or forming. With a given conductive filler material selected, increasing the volume fraction of filler in the elastomeric material will in general decrease the electrical resistance (improving the electrical conducting properties) of the resulting seal. However, the volume fraction of conductive filler cannot be increased without limit as increasing the volume fraction beyond a point results in an undesirable impairment of mechanical properties of the seal itself and/or degradation of seal surface quality.

Generally increasing the volume fraction of conductive filler moves the mechanical properties of the seal from a seal that is comparatively softer, stronger and of low electrical conductivity towards a seal that is harder (less pliable), less mechanically strong and of increased electrical conductivity. As this is the case, there is an engineering tradeoff decision to be made between seal softness and strength vs. electrical conductivity.

The effect of seal mechanical property dependency on chosen electrical conduction properties may be decoupled by realizing a substantially non-conductive elastomeric seal with a separate electrically conductive layer formed over portions of the exterior of the seal. The electrically conductive layer may be realized as electrically conductive (as discussed earlier above), or by applying (for example) a metallic coating, such as a spray coating, electrically sputtered coating (possibly vacuum coating) or dip coating. Alternately the electrically conductive layer may be realized as an electrically conductive polymer layer formed over or applied onto the exterior of the seal. For example, such a conductive polymer layer may be formed by overmolding a conductive polymer (exemplary realizations discussed above) onto an elastomeric substantially non-conductive seal core. In such a configuration the elastomeric seal core may be relied upon to provide optimum seal mechanical properties (elastomeric or rubber-like properties) while the overmolded conductive polymer provides the desired electrical conduction properties.

It is envisioned that advantageous conductive seals of the present invention disclosure may be realized by leveraging and applying any one or combinations of the teachings discussed in detail above, and may be combined together with other knowledge already known to those skilled in the art to provide additional advantageous embodiments utilizing the teachings of the present inventive disclosure. The disclosure now continues particularly with reference to exemplary instructive embodiments depicted in the provided drawings.

FIG. 1 is a cut-away perspective view that illustrates a prior art flange and gasket sealing arrangement in which an apparatus 22 is supportively mounted on an intermediate flange 24 and sealed by the addition of flat annular gaskets 16. Apparatus 22 may be, for example, a filter element or a liquid separation apparatus (coalescing element) for removing entrained liquid mist or droplets from a gaseous stream, such as compressed air from an air compressor (not shown). Other applications prone to electric charge buildup are also suitable applications for the present invention. In the example illustrated in FIG. 1, the supported apparatus 22 is secured onto and supported within the interior of the housing 20 by the intermediate flange 24. It is to be understood herein that the illustration of a filter or separator apparatus 22 is only one suitable application for the invention and is intended to illustrate one application as an aid for better comprehension and enablement and is not to be understood as limiting as clearly the teachings herein are advantageous in many other applications. For a few additional examples, the invention (discussed earlier above and in further detail later below) may be applied to uses, such as for supportively mounting a flow check valve within a ducted or piped flow stream, or supportively mounting a mass air flow sensor within a ducted or piped air stream and so on. Additionally, the flange with the integral electrically conductive seal (discussed later below with FIG. 2) of the present invention may be applied between two flanges (12 and 14) without providing a supported apparatus 22, its application to provide a seal between flanges (12 and 14) as well as provide an electrically conductive path for electrical current flow between the flanges (12 and 14).

The presented example application of FIG. 1 (shown with prior art sealing) may be understood as an air/oil separator applied to remove an entrained liquid aerosol from a gaseous flowing media, such as after an air compressor. Such compressed air or gas applications, particularly those with entrained contaminants such as liquid mist, are well known as susceptible to the accumulation of an electrostatic charge on the components exposed to the flow stream as discussed earlier in the Background section. The coalescing element 29 includes the intermediate flange 24 secured thereto so as to be purchasable and replaceable as a unit.

In the prior art sealing arrangement of FIG. 1, the intermediate flange 24 is compressibly mounted between an upper flange 12 and a lower flange 14 and is spaced apart from the flanges (12,14) by flat annular gaskets 16. Typical gasket materials, as discussed earlier above, are not generally electrically conductive. In the present prior art example, to dissipate electric charge from the supported apparatus 22 (secured to and supported by intermediate flange 24), it is necessary to provide a ground strap or conductive ground connection (such as an electrically conductive wire) (not shown) secured to the intermediate flange 24 and connecting to an electrical path to ground. It may be that the upper 12 and/or lower flange 14 are metallic and have a path to electrical ground, however the annular gaskets 16 unfortunately spaces the intermediate flange 24 from the flanges (12, 14), this spacing as well preventing a reliable electrical connection to ground through the flanges (12,14).

So the prior art sealing arrangement of FIG. 1 is disadvantaged in several ways, one must supply annular gaskets 16 to provide a seal at each face (26, 28) of the intermediate flange 24 to realize a desired fluidic seal. One must also provide a ground strap or ground connection connecting the intermediate flange 24 to a reliable electrical ground to dissipate accumulated static charge. This is the configuration typically practiced in compressed air and other static charge accumulation prone gaseous flow applications and is the problematic prior art configuration resolved by the present inventive disclosure.

Figure 2:
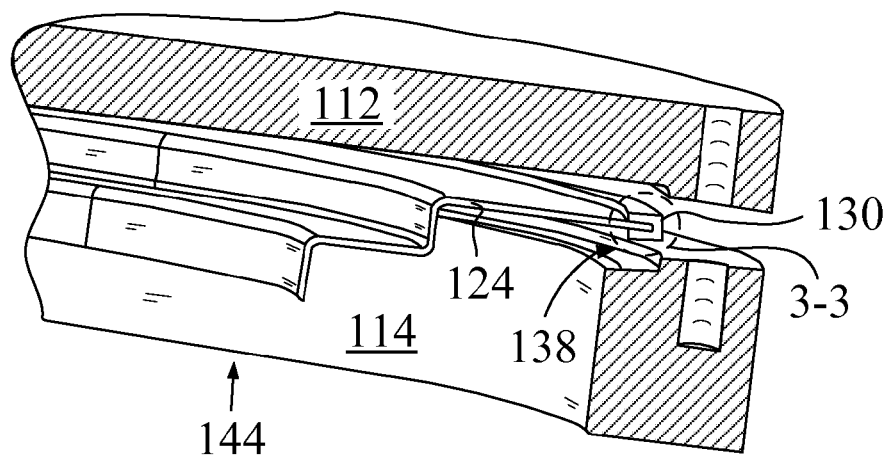
FIG. 2 illustrates an exploded sectional view of various inventive aspects of the present invention.

FIGS. 2 and 2A illustrate in an exploded sectional view various inventive aspects (in one example embodiment) of the electrically conductive sealing arrangement of the present invention. The invention includes an intermediate flange 124 having an electrically conductive seal 130 integrated therewith. According to the present inventive disclosure, conductive seal flange body 124 has integrated thereon an electrically conductive elastomeric seal 130 circumferentially arranged on the circumferential outer edge 132 of the conductive seal flange body 124. Advantageously, the conductive seal 130 extends over the outer edge 132 and onto at least a portion of the opposing seal flange faces (126 and 128) and is positioned to sealably engage upper flange 112 and lower flange 114 without requiring the use of prior art gaskets 16 (gaskets shown in FIG. 1).

In at least one embodiment of the present invention, the conductive seal 130 is formed directly onto or retentively applied onto the circumferential outer edge 132 of an electrically conductive flange 124. The conductive seal 130 may be directly molded onto the circumferential outer edge 132 of the seal flange 124 using known techniques such as injection molding or overmolding of the elastomeric seal material directly onto the seal flange 124.

In at least one alternate embodiment, the conductive seal 130 may be formed as a separate molded component and then later retentively installed or secured onto the circumferential outer edge 132 of the seal flange 124 by relying upon the elastomeric properties of the seal material itself to permit stretching of the seal circumferentially over and the installation onto the outer edge 132 of the electrically conductive seal flange 124.

In either case, the desired end result is an electrically conductive elastomeric seal 130 secured onto the outer edge 132 of the seal flange 124 and configured such that the seal exhibits seal faces (134 and 136) positioned respectively on opposing faces (126, 128) of the seal flange 124. Advantageously, the flange with the electrically conductive seal 100 thus configured eliminates the need to provide and install the prior art annular gaskets 16 (see FIG. 1) as currently practiced in the prior art to seal the opposing end faces of the intermediate flange (24, see FIG. 1). Advantageously, the elimination of the gaskets 16 (see FIG. 1) by the seal flange (124+130) of the present inventive disclosure thereby reduces cost and complexity.

According to the present invention, the fluid, gas or air pipeline or duct mounting flanges (schematically represented by upper 112 and lower 114 flanges) between which the seal flange 124 installs are configured and adapted to provide a tight-fit seal receiving and guiding contour 138 provided in either one or both of the mounting flanges (112 and 114).

Preferably the seal receiving and guiding contour 138 is configured as a groove formed in the flange(s) in which opposing side walls 140 are tapered so as to provide a wider opening at the mouth 142 of the groove 138 (the mouth understood as the portion opening into the interior fluid carrying aperture 144 of the flange) relative to the width of the groove at the bottom 146 of the groove 138 (the bottom understood herein as the circumferential outermost wall of the groove). Such a tapered configuration is operable, when the mounting flanges (112, 114) are urged together to mate, thereby apply a radially inwardly directed force on the conductive seal 130 further urging the seal 130 against the outer edge 132 of the seal flange 124, while the resulting inwardly directed force on the seal also acts to center or more exactly position the seal flange 124 between the mounting flanges (112, 114) during assembly as well as compress the conductive seal 130 for achieving a suitable fluid-tight seal.

In other suitable embodiments, the opposing side walls 140 may be positioned apart in a spaced parallel relationship (parallel rather than the above tapered configuration), wherein the spaced parallel opposing side walls 140 remain operable to compress the conductive seal 130 for achieving a suitable fluid-tight seal.

The disclosed configuration of the seal guiding and receiving contour 138, even further with the just discussed complimentary tapered configuration of the seal faces (134, 136) and walls of the seal groove (side walls and bottom wall), are advantageously operative to provide a more precise and repeatable lateral (cross-axial) positioning of the conductive seal flange 124 with respect to the flanges (112, 114). The more precise and repeatable positioning is advantageously operable in many ways, for one example: to ensure a precise positioning of a supported apparatus (for example apparatus 22 in FIG. 1) within a housing 20 (see FIG. 1), thereby enabling closer dimensional tolerances between the supported apparatus 22 and the housing 20. Other advantageous results can be readily envisioned and obtained from the more precise and repeatable flange positioning provided by the present invention. Additionally, the configuration of the seal guiding and receiving contour 138 configures the mount flanges (112, 114) to directly contact and circumferentially close on each other along a portion of their respective flange faces, thereby completely enclosing the conductive seal 130 within the flanges and isolating the seal 130 from the outside environment. This full contact closure of the flange faces also ensures repeatable and precise positioning of the mounting flanges (112, 114) relative to each other as their spacing is no longer dependent upon the prior art gasket thickness and its degree of compression. This full circumferential enclosure of the seal in the mounting flanges is advantageously operative to limit the amount of any potential leakage if the seal 130 should fail as the groove in which the seal rests is isolated from the outside environment.

FIG. 3 depicts an enlarged partial sectional view of the seal flange with the electrically conductive seal, specifically the region identified as "3-3" in FIG. 2. FIG. 3 more clearly illustrates the tapered configuration of the seal faces (134 and 136) of the seal 130 correlating to the tapered sidewalls of the seal receiving and guiding contour 138 (see FIG. 2A). FIG. 3 also depicts a preferred sectional configuration of the conductive seal 130 (in cross section) as directly molded onto or secured onto the outer edge 132 and side faces of the seal flange 124.

FIG. 4 schematically illustrates an alternate embodiment of the conductive seal 230 depicting an electrically conductive outer layer 250 overmolded onto, or arranged onto, sprayed onto or otherwise deposited onto at least a portion of the outer surface of the elastomeric core 252 of the seal 230. It should be readily understood that the alternate conductive seal arrangement depicted in FIG. 4 may be used in place of the conductive seal 130 illustrated in FIGS. 2, 2A and 3 and thereby provides an alternate path to a similar result.

As discussed earlier above, the electrically conductive layer 250 may be realized as an electrically conductive, possibly metallic coating, such as a spray coating, electrically sputtered coating or a dip coating. Alternately the electrically conductive layer 250 may be realized as a conductive polymer layer 250 formed over or applied onto the exterior of the elastomeric core 252 of the seal. For example, such a conductive polymer layer 250 may be realized by overmolding a conductive polymer (formulation as discussed above) onto an elastomeric possibly non-conductive seal core 252. In such a configuration the elastomeric seal core may be relied upon to provide optimum seal mechanical properties while the overmolded conductive polymer 250 then provides the electrical conduction properties to form a seal having desired mechanical and electrical properties.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all of the claims The invention is defined solely by the appended claims including any amendments made during the pendency of this application and all equivalents of those claims as issued.

The invention claimed is:

1. A sealing arrangement comprising:
two opposing mounting flanges each including a flange face, said flange faces arranged in a confronting facing relationship;
a seal flange installable between said flange faces and configured to seal between said confronting mounting flanges, said seal flange including
 a seal flange body having a flat annular portion with opposing seal flange faces configured to be received between said mounting flange faces; and
 a seal flange circumferential outer edge extending between said opposing seal flange faces;
an annular electrically conductive elastomeric seal arranged on an outer circumferential edge of said seal flange body, said conductive seal including a continuous radial groove formed into a radially inner face of said seal;
wherein said circumferential outer edge of said seal flange is received into said radial groove of said seal;
wherein said electrically conductive seal has opposing seal leg members extending over said outer edge and each onto at least a portion of a respective one of said seal flange faces;
wherein said electrically conductive seal is operative to conduct electric charge between said seal flange body and said mounting flanges;
wherein said conductive elastomeric seal is provided as a separate molded component elastically retained on said circumferential outer edge of said seal body, said seal elastically stretched over and installed onto said seal flange circumferential outer edge by utilizing elastomeric properties of said seal;
wherein said mounting flanges include a seal receiving and guiding contour;
wherein said seal receiving and guiding contour, when said mounting flanges confront and mate, form a continuous groove geometry complimentary to geometry of outer faces of said seal legs, said guiding contour sized and configured to elastically compress said seal when said seal flange body is mounted between said mounting flanges;
wherein said groove geometry of said seal receiving and guiding contour includes:
 a first groove sidewall formed in a face of a first one of said mounting flanges;
 a second groove sidewall opposite said first groove sidewall, said second groove sidewall formed in a face of a second one of said mounting flanges;
 wherein said groove geometry includes a mouth between said opposing mounting flanges opening radially inwardly into an interior fluid carrying aperture of said mounting flanges;
 wherein said groove geometry has a circumferential outermost bottom wall formed in at least one of said mounting flanges and arranged radially outwardly from said mouth;
wherein said opposing seal legs have outer seal faces with a geometry complimentary to said groove sidewalls of said mounting flanges.

2. The sealing arrangement according to claim 1, wherein said electrically conductive elastomeric seal is provided as a separate molded component installed onto said outer edge of said seal flange body by stretching said conductive elastomeric seal circumferentially over and installing onto said seal flange outer edge by utilizing elastomeric properties of said seal.

3. The sealing arrangement according to claim 1, wherein said seal receiving and guiding contour cooperating with complimentary geometry of said electrically conductive elastomeric seal is configured to permit full circumferential mating contact between the flange faces of said mounting flanges;
wherein said electrically conductive elastomeric seal is fully enclosed by and isolated from an external environment within said mated mounting flanges; and
wherein said mating closure of said mounting flanges reduces leakage in the event of seal failure.

4. The sealing arrangement according to claim 1, wherein said electrically conductive elastomeric seal comprises polymer material forming a base material into which electrically conductive particulate materials are dispersed;
wherein said electrically conductive particulate materials include any of: metal particles, metal covered particles, carbon black, graphite, and soot; and
wherein a minimum volume fraction of said electrically conductive particulate materials is chosen such as to assure at least a sufficient number of said electrically conductive particulate materials contact each other in said elastomeric seal so as to form an electrically conductive path between two or more differing locations on external portions of said seal.

5. The sealing arrangement according to claim 4, wherein said volume fraction is selected to provide a desired compromise between elastomeric softness and mechanical strength properties of said seal relative to electrical conductivity of said seal.

6. The sealing arrangement according to claim 1, wherein said seal flange is electrically conductive.

7. The sealing arrangement according to claim 1, wherein said electrically conductive elastomeric seal comprises:
an elastomeric core configured to provide elastomeric sealing properties to the seal; and
an electrically conductive layer arranged on outer portions of said elastomeric core, said electrically conductive layer configured and adapted to provide electrical conduction properties of said electrically conductive elastomeric seal.

8. The sealing arrangement according to claim 7, wherein said electrically conductive layer is a conductive polymeric layer overmolded onto said elastomeric core.

9. The sealing arrangement according to claim 7, wherein said electrically conductive layer is any of: an electrically conductive spray coating, an electrically conductive coating applied by dipping the seal into the coating material, a metallic conductive layer deposited by sputtering, an electrically conductive film attached to outside portions of said elastomeric core.

10. A coalescing apparatus for separating an entrained liquid aerosol from a gaseous flowing media comprising:
a sealing arrangement according to claim 1;
a coalescing media secured onto and supported by said seal flange, said coalescing media operative for trapping and removing at least a portion of said liquid aerosol from said flowing media, said seal flange and said coalescing media forming a replaceable coalescing element; and
a housing surrounding said coalescing element, said housing having one of said mounting flanges secured thereto and in through which a portion of said coalescing element is received into said housing, said coalescing element media mounted and positioned within said housing by mounting of said seal flange between said mounting flanges;
wherein said electrically conductive elastomeric seal is operative to fluidically seal said seal flange between said mounting flanges; and
wherein said electrically conductive elastomeric seal is electro-conductively operative to dissipate accumulated static charges from said coalescing element by conducting said charges through at least one of said mounting flanges.

11. A coalescing element for separating an entrained liquid aerosol from a gaseous flowing media comprising:
a sealing arrangement according to claim 1; and
a coalescing media secured onto and supported by said seal flange, said coalescing media operative for trapping and removing at least a portion of said liquid aerosol from said flowing media;
wherein said coalescing element is configured to be replaceably installable into a coalescing apparatus.

* * * * *